US009818277B1

(12) United States Patent
Solh et al.

(10) Patent No.: US 9,818,277 B1
(45) Date of Patent: Nov. 14, 2017

(54) SYSTEMS AND METHODS FOR SMOKE DETECTION

(71) Applicant: Amazon Technologies, Inc., Seattle, WA (US)

(72) Inventors: Mashhour Solh, San Jose, CA (US); Michael Serge Devyver, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 14/810,099

(22) Filed: Jul. 27, 2015

(51) Int. Cl.
*G06K 9/00* (2006.01)
*G08B 17/10* (2006.01)
*G06K 9/62* (2006.01)
*H04N 5/232* (2006.01)
*H04N 5/247* (2006.01)
*G06K 9/20* (2006.01)

(52) U.S. Cl.
CPC .......... *G08B 17/10* (2013.01); *G06K 9/00711* (2013.01); *G06K 9/6202* (2013.01); *G06K 9/6215* (2013.01); *H04N 5/23238* (2013.01); *H04N 5/247* (2013.01); *G06K 2009/2045* (2013.01)

(58) Field of Classification Search
CPC .. G08B 17/10; G06K 9/00711; G06K 9/6215; G06K 9/6202; H04N 5/23238; H04N 5/247
See application file for complete search history.

(56) References Cited

U.S. PATENT DOCUMENTS

| 6,844,818 B2 * | 1/2005 | Grech-Cini ........ G06K 9/00771 340/577 |
| 2007/0019071 A1 * | 1/2007 | Haynes ................ G08B 17/125 348/135 |
| 2009/0219389 A1 | 9/2009 | Marbach |

\* cited by examiner

*Primary Examiner* — Siamak Harandi
(74) *Attorney, Agent, or Firm* — Eversheds Sutherland (US) LLP (57) ABSTRACT

Provided are systems and methods for smoke and fire detection. An example method includes receiving two or more image frames that represent images of two or more areas, combining the two or more image frames to generate a composite image frame that represents an image of an area comprising the two or more areas, comparing the composite image frame to a background frame associated with the area to determine one or more pixels of the composite frame having a pixel value that is different from corresponding pixels of the background frame, determining a smoke frame, wherein pixels of the smoke frame that correspond to the one or more pixels of the composite frame comprise a pixel value associated with smoke, determining a smoke value corresponding to pixel values of the pixels of the smoke frame, determining that the smoke value exceeds a smoke threshold value, determining a smoke or fire condition based at least in part on determining that the smoke value exceeds a smoke threshold value, and providing an indication of the smoke or fire condition.

20 Claims, 5 Drawing Sheets

SYSTEMS AND METHODS FOR SMOKE DETECTION

BACKGROUND

Fires can be catastrophic events that cause significant losses, including loss of life and loss of property. In many instances, smoke detectors are used to sense the presence of smoke and fires provide a corresponding warning, such an audible/visual alert. Many smoke detectors sense the presence of smoke as it passes through or near sensors of the smoke detectors. Thus, smoke detectors can require smoke to be physically present at the smoke detector to be detected. This can reduce a smoke detector's sensitivity to smoke that is not proximate the smoke detector, and can delay the detection of smoke and fire.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

Described herein are systems and methods for smoke detection. In some embodiments, a smoke detection system can employ two or more cameras to capture overlapping images of an area (or scene), and the images can be processed to detect the presence of smoke and/or a fire.

In some embodiments, at least first and second cameras can be positioned adjacent one another with at least partially overlapping fields of view (FOVs) that capture images of an area. For example, a first video camera may capture video images (e.g., including multiple image frames) of right and center portions of an area and a second video camera may capture images of the same center portion of the area along with a left portion of the area. Such camera arrangements may provide an overall field of view that provides full coverage of the area, and can provide for generating a contiguous image that extends from the right portion of the area to left portion of the area. Although certain embodiments are describe with regard to a certain type and number of cameras (e.g., 2 or 4 video cameras) for the purpose of illustration, the techniques described herein can be employed with any number and types of cameras.

In some embodiments, image frames captured by two or more cameras at or near the same time can be combined to generate a composite image frame that depicts an area at or near the time. For example, a first image frame captured by the first video camera (e.g., depicting a first area including the right and center portions of the area) may be combined with a second image frame captured at or near the same time by the second video camera (e.g., depicting a second area including the left and center portions of the area), and the image frames can be used to generate a composite image frame that is a combination of the two images. The composite image frame may include, for example, a depiction of the right portion of the area provided in the first image frame, a depiction of the left portion of the area provided in the second image frame, and a depiction of the center portion of the area that is generated using one or both of the depictions of the center portion of the area provided in the first and second image frames.

In some embodiments, a composite image frame depicting an area can be compared to a background frame of the area to identify difference in the composite image frame relative to the background frame. Thus, a background frame may be used as a reference to determine visible changes in the area captured in the current composite image frame. For example, the composite image frame for an area may be subtracted from a background frame of the area to generate pixel change values. The pixel change values may indicate, on a pixel-by-pixel basis, a difference between the value of each pixel in the composite frame and the value of a corresponding pixel in the background frame. Thus, for example, if a pixel in a first location in the composite image frame (e.g., the upper right-hand corner of the composite image frame) has a value of 205 and a corresponding pixel in the same location in the background frame has a value of 200, subtraction of the frames may determine a difference (also referred to as a "pixel change value") of about 5 for the first pixel location. As a further example, if a pixel in a second location in the composite image frame (e.g., in the middle of the composite image frame) has a value of 225 and a corresponding pixel in the same location in the background frame has a value of 210, subtraction of the images may determine a pixel change value of about 15 for the second pixel location. A similar subtraction process can be conducted for some or all of the pixel locations in the two images to generate a pixel change value for some or all of the pixel locations in the composite image frame. As discussed in more detail below, pixel change values can be used to generate a smoke frame that is indicative of the presence of smoke in a field of view of one or more cameras.

In some embodiments, an updated background frame can be generated using a composite image frame. For example, an updated background frame can be generated by a weighted combination of a composite image frame (e.g., including the first and second pixel locations having values of 205 and 225, respectively) with a current version of the background frame (e.g., including the first and second pixel locations having values of 200 and 210, respectively). In some embodiments, the background frame can be weighted more heavily than the composite image frame (e.g., 9999 to 1) such that the pixel values for pixel locations in the updated background frame generally reflect the pixel values of corresponding pixel locations in the background frame, but can slowly shift over time if the pixel values in subsequent composite image frames continue to differ from those in the background frame(s). Continuing with the above example, if a 9999 to 1 weighting is employed, the pixel value for the first pixel location in the updated background frame may be about 200.0005 (e.g., 200.0005=0.9999*200+ 0.0001*205) and the pixel value for the second pixel location in the updated background frame may be about 210.0015 (e.g., 210.0015=0.9999*210+0.0001*225). Pixel values for each of the pixel locations in the updated background frame can use determined in a similar manner.

In some embodiments, an updated background frame can be used as the basis for comparison of future composite image frames. For example, if 100 composite image frames were received previously, those 100 image frames were used to generate a current background frame, and a $101^{st}$ composite image frame is received, then the $101^{st}$ composite image frame can be compared to the current background frame (e.g., the background frame generated using the 100 image frames) to identify differences in the $101^{st}$ composite image frame relative to the background frame (e.g., to determine pixel change values for the pixel locations in the 100 composite image frame relative to the current background frame). Further, the composite image frame (e.g., including the first and second pixel locations having values of 205 and 225, respectively) can be combined with a current version of the background frame (e.g., including the first and second pixel locations having values of 200 and 210, respectively) to generate an updated background frame (e.g., including the first and second pixel locations having pixel values of about 200.0005 and about 210.0015, respectively). If a next, $102^{nd}$ composite image frame is received, then the $102^{nd}$ composite image frame can be compared to the current background frame (e.g., the background frame generated using the 101 image frames and including the first and second pixel locations having pixel values of about 200.0005 and about 210.0015, respectively) to identify differences in the $102^{nd}$ composite image frame. The $102^{nd}$ image frame can, then, be used to generate an updated background frame that can be used to assess the next composite image frame and so forth.

As mentioned above, in some embodiments, the pixel change values determined based on a comparison of a background frame of an area and a composite image of the area can be used to generate (or update) a smoke frame that is indicative of the presence of smoke in a field of view of one or more cameras. For example, the determined pixel change values for the pixel locations can be assessed to identify one or more pixel locations associated with a pixel change value that is equal to or greater than a pixel change threshold value (e.g., indicating that the pixel value for the pixel location of the composite image is at least a threshold amount different than the pixel value for a corresponding pixel location in the background frame). One or more pixel values of one or more pixels locations of the smoke frame corresponding to the one or more pixels locations associated with a pixel change value that is equal to or greater than a pixel change threshold value (e.g., 10) can be set to a predetermined value associated with smoke (e.g., a pixel value of 255). Continuing with the above example in which a pixel change value of 5 is associated with the first pixel location and a pixel change value of 15 is associated with the second pixel location, if a pixel change threshold value is set to 10, then a value for a first pixel location in the smoke frame (e.g., a pixel location in the upper right-hand corner of the smoke frame) corresponding to the first pixel location in the composite image frame (e.g., in the upper right-hand corner of the composite image frame) may be set to a value of 0 based on the associated pixel change value of 5 being less than the pixel change threshold value of 10. Further, a value for a second pixel location in the smoke frame (e.g., a pixel in the middle of the smoke frame) corresponding to the second pixel location in the composite image frame may be set to a value of 255 based on the associated pixel change value of 15 being greater than the pixel change threshold value of 10. Pixel values for some or all of the other pixel locations in the smoke frame can be updated in a similar manner to generate a smoke frame that includes pixel values of 255 for pixel locations associated with pixel change values that are equal to or greater than the pixel change threshold value and/or pixels values of 0 for pixel locations associated with pixel change values that are less than the pixel change threshold value.

In some embodiments, a smoke frame can be used to determine whether smoke and/or fire is present. For example, the pixel values of the pixel locations in the smoke frame can be added together to generate a sum of the pixel values of pixel locations in the smoke frame for the smoke frame (also referred to herein as a "smoke frame value" for the smoke frame). The smoke frame value can be compared to a smoke threshold value. If the smoke frame value is equal to or greater than the smoke threshold value, then it may be determined that smoke (and/or fire) is present. If, however, the smoke frame value is less than the smoke threshold value, then it may be determined that smoke (and/or fire) is not present.

In some embodiments, the distance to a feature captured in a composite image frame may be determined, and then utilized to further distinguish smoke or fire from background features, such as walls. For instance, if the distance to a feature captured in a composite image is less than the a known distance to a different feature typically captured at that location in the composite image frame, such as a wall, then a weighting factor may be applied to the pixel values of the pixels corresponding to the feature. This may be done, for example, to the composite image frames or the smoke frame. As an example, in the overlapping regions of a composite image frame the distance to a feature in the area being imaged may be determined using parallax, and if it is determined that a feature in a composite image frame is closer than a known background feature, such as a wall, then the pixel locations associated with the feature in the composite image frame may be weighted differently than other pixels in the composite image frame. Alternatively, a filter may be applied to distinguish between background features and new features, such as smoke or fire, based on known distances to the background features.

In some embodiments, a corresponding indication can be provided. For example, if it is determined that smoke (and/or fire) is present a corresponding indication can be provided (e.g., an indication of a fire can be provided to a monitoring entity and/or a fire alarm can be triggered). If it is determined that smoke (and/or fire) is not present a corresponding indication can be provided (e.g., an all-clear signal may be provided to a monitoring entity and/or fire alarm may not be triggered).

In some embodiments, characteristics of two overlapping image frames can be used to determine which, if either, of the two image frames can be used to generate a corresponding composite image frame. In some embodiments, if frames depicting portions of an area have an overlapping portion, and each of the overlapping portions of the frames are not oversaturated, then both of the image frames can be used in generating a corresponding composite image frame. In some embodiments, a saturation value for an image frame (or a portion of an image frame) can be determined as an average of the pixel values for the frame (or the corresponding portion of the frame). Continuing with the above example, if the first image frame depicts right and center portions of an area and, and the second image frame depicts the same center portion of the area along with a left portion of the area (e.g., such that the first and second frames have overlapping portions corresponding to the portions of the respective frames depicting the center portion of the area), and it is determined that a first saturation level (or value) for the first portion of the first image frame depicting the center portion of the area is above a saturation threshold value (e.g., above a saturation threshold value of 20), and that a second saturation level for the second portion of the second image frame depicting the center portion of the area is also above the saturation threshold value, then a composite image frame may be generated using both of the image frames. In such an instance, the overlapping portion of the composite image frame corresponding to the center portion of the area can be generated based on a combination of the corresponding portions of the two image frames. This can include, for example, each pixel location in the overlapping portion of the composite image frame being assigned a pixel value that is the maximum value of the pixel values for the corresponding pixel locations in the image frames used to generate the frame, each pixel location in the overlapping portion of the composite image frame being assigned a pixel value that is the median value of the pixel values for the corresponding pixel locations in the image frames used to generate the frame, and/or the like.

In some embodiments, if image frames depicting portions of an area have an overlapping portion, and one or more of the overlapping portions of the frames are not oversaturated, then the image frame(s) associated with the non-oversaturated overlapping portions can be used to generate a corresponding composite image frame. Continuing with the above example, if it is determined that a first saturation level for the first portion of the first image frame depicting the center portion of the area is below a saturation threshold value (e.g., below a saturation threshold value of 20), and that a second saturation level for the second portion of the second image frame depicting the center portion of the area is above the saturation threshold value, then a composite image frame can be generated using the second image frame. In such an instance, the overlapping portion of the composite image frame corresponding to the center portion of the area may be generated using the corresponding pixel values for the corresponding pixel locations in the second image frame.

In some embodiments, exposures of cameras can be alternated. Continuing with the above example, the first camera may be configured to capture images using a relatively low exposure, and the second camera may be configured to capture images using a relatively high exposure. Such alternating exposures may help to distinguish certain events, such as when a light is turned-on resulting in the image frames for both cameras being saturated, and/or a smoke event in which one camera's image is saturated due to smoke or other visible characteristics of the area.

Figure 1:
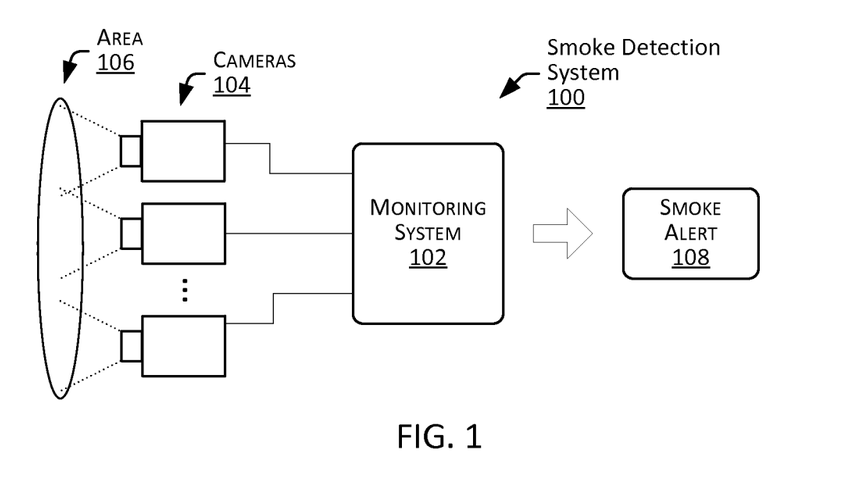
FIG. 1 is a diagram that illustrates an example smoke detection system in accordance with one or more embodiments.

FIG. 1 is a diagram that illustrates an example smoke detection system 100 in accordance with one or more embodiments. The system 100 may include a monitoring system 102 and one or more cameras 104. The cameras 104 may capture images of an area 106 and provide those images to the monitoring system 102. The monitoring system 102 may process the images to determine whether smoke is present. Upon determining that smoke is present, the monitoring system 102 may provide a corresponding smoke (and/or fire) alert 108.

In some embodiments, a camera 104 can include an optical instrument for acquiring images. In some embodiments, a camera 104 can include a digital camera that capture light using an image sensor (e.g., a CCD sensor, CMOS sensor and/or the like), and encode signals received from the image sensor to generate digital images. The resulting digital images can include a two-dimensional (2D) array of pixels that each correspond to a particular location (or pixel location) in the image. Each pixel in the 2D array may be assigned or otherwise associated with a value (also referred to as a "pixel value") corresponding to a signal received from a corresponding portion of the image sensor. An image generated by a camera 104 having a resolution of 640 pixels by 480 pixels may include approximately 307,200 pixels (e.g., 640×480=307,200). As described above, each pixel of an image may correspond to a particular location in the image and may be assigned a particular pixel value. In an 8-bit black and white image, for example, each pixel may be associated with a location in the image and have a pixel value in the range of 0-255. A pixel value of 0 may correspond to a "white" pixel and a pixel value of 255 may correspond to a "black" pixel, with value between 0 and 255 corresponding to various shades of grey. In some embodiments, images acquired by a camera 104 can be stored locally (e.g., in a memory of the camera 104) and/or be transmitted to another entity, such as the monitoring system 102. In some embodiments, a camera 104 can include a "still" camera for capturing still images (e.g., a single image frame) and/or a "video" camera for capturing consecutive images in sequence (e.g., consecutive image frames). In some embodiments, a video camera 104 may acquire images at a given frame rate (or frame frequency), such as 60 frames per second (FPS) (or 60 Hertz (Hz)). A frame rate of 60 may refer to a camera 104 acquiring an image (also referred to as an "image frame") about once every 0.0167 seconds. In such an embodiment, the image frames can be combined to generate a video image that includes multiple image frames that can be played back in sequence. Although certain embodiments are described with regard to images of a particular resolution (or size) and type, similar embodiments can be employed with any suitable image resolution and type.

In some embodiments, a camera 104 may include an infrared (IR) illumination source for improved image capture in low light conditions, such as nighttime. For example, a low cost and low power IR diode may be utilized to illuminate the area 106, and the image sensor of a camera 104 may include IR sensitivity/capability. The camera 104 may be black and white or a dual mode camera that is capable of switching between a daytime mode to night vision mode to maximize the image resolution captured either day or night. Further, the IR illumination may remain constantly on or may be actuated on and off by, for example, a photodiode sensor detecting a level of ambient light.

In some embodiments, the monitoring system 102 can include an electronic computing device that can receive image frames from the one or more cameras 104, process the one or more image frames to determine whether or not smoke is present in the area 106 depicted by the one or more image frames, and/or provide a corresponding smoke (and/or fire) alert 108. In some embodiment, the monitoring system 102 can include one or more program modules comprising program instructions that are executable by a processor to cause some or all of the operations described with regard to the monitoring system 102. For example, as described herein, the monitoring system 102 may include a frame combining module, a frame comparison module, a background frame update module, a smoke frame update module, a smoke detection module, and/or the like. In some embodiments, the monitoring system 102 can include one or more computer systems similar to that of the computer system 1000 described below with regard to at least FIG. 6.

In some embodiments, the smoke detection system 100 can include multiple cameras 104 arranged to capture images of adjacent portions of an area 106. For example first and second video cameras 104 may be positioned adjacent one another with at least partially overlapping fields of view (FOVs) to capture images of the area 106. The first camera 104 may capture video images of right and center portions of the area 106 and, and the second video camera 104 may capture images of the same center portion of the area 106 along with a left portion of the area 106. Such camera arrangements may provide an overall field of view that provides full coverage of the area 106, and can provide for generating a contiguous image that extends across the area 106 (e.g., from the right portion of the area 106 to left portion of the area 106).

In some embodiments, cameras 104 can be aimed in different directions relative to one another to capture an expanded view of an area 106. For example, two cameras 104 having fields of view of about 100 degrees each can be placed adjacent one another and aimed in different directions (e.g., rotated about 80 degrees relative to one another) to capture an approximately 180 degree FOV of an area 106. In such an embodiment, the fields of view of the cameras 104 may overlap by about 20 degrees, and the images captured by the cameras 104 may have a corresponding overlapping portion. That is, for example, a portion of (e.g., about 20% of) a first image captured by the first camera 104 may depict the same portion of the area 106 as a portion of (e.g., about 20% of) a second image captured by the second camera 104. In some embodiments, any number of cameras 104 and/or arrangements of camera 104 can be used to capture images that can provide an expanded field of view. For example, four cameras 104 having fields of view of about 100 degrees each, can be placed adjacent one another and aimed in different directions (e.g., rotated about 90 degrees relative to one another) to capture an approximately 360 degree field of view of an area 106.

Figure 2:
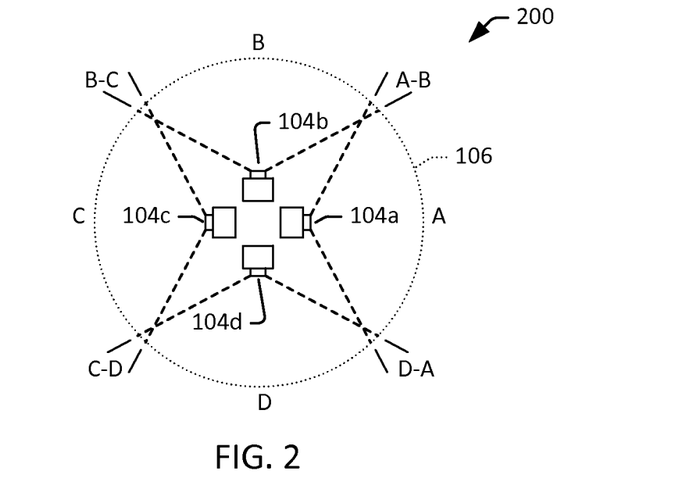
FIG. 2 is a diagram that illustrates a top-view of a camera arrangement in accordance with one or more embodiments.

FIG. 2 is a diagram that illustrates a top-view of a camera arrangement 200 including four cameras 104 (e.g., cameras 104a, 104b, 104c and 104d) that are arranged to provide a 360 degree field of view in accordance with one or more embodiments. In the illustrated embodiment, each of the cameras 104 is arranged at an angle of about 90 degrees relative to adjacent cameras 104. For example, a first camera 104a may be aimed at approximately 0 degrees, a second camera 104b is aimed at approximately 90 degrees, a third camera 104c is aimed at approximately 180 degrees, and a fourth camera 104d is aimed at approximately 270 degrees. Each of the cameras 104 may include an approximately 100 degree field of view, as represented by the respective sets of dashed lines extending away from the cameras 104. Further, each pair of adjacent fields of view includes an overlapping region, as indicated by the crossover of the respective sets of dashed lines extending away from adjacent pairs of the cameras 104. That is, for example, the first camera 104a may be employed to capture images of a first portion of the area 106 (e.g., area A), the second camera 104b may be employed to capture images of a second portion of the area 106 (e.g., area B), the third camera 104c may be employed to capture images of a third portion of the area 106 (e.g., area C), and the fourth camera 104d may be employed to capture images of a fourth portion of the area 106 (e.g., area D). Further, the fields of view of the first and second cameras 104a and 104b may include a first overlap portion (e.g., portion A-B), the fields of view of the second and third cameras 104b and 104c may include a second overlap portion (e.g., portion B-C), the fields of view of the third and fourth cameras 104c and 104d may include a third overlap portion (e.g., portion C-D), and the fields of view of the fourth and first cameras 104d and 104a may include a fourth overlap portion (e.g., portion D-A). In some embodiments, the camera 104 may be configured with alternating exposures. For example, the first and third cameras 104a and 104c may be configured to capture images using a relatively low exposure, and the second and fourth cameras 104b and 104d may be configured capture images using a relatively low exposure. In some embodiments, the monitoring system 102 may send signals to the cameras 104 to cause them to be configured in a particular manner, including, for example, a frame rate, frame resolution, exposure level, and/or the like.

Figure 3:
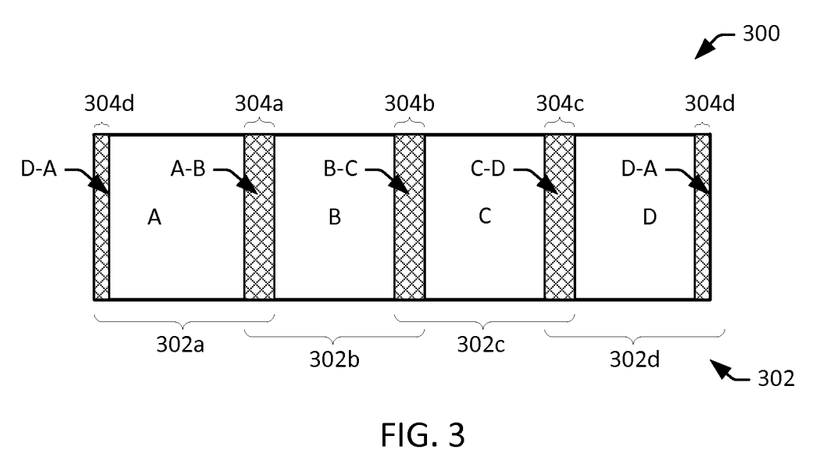
FIG. 3 is a diagram that represents an example composite image frame that may be generated using the camera arrangement of FIG. 2 in accordance with one or more embodiments.

FIG. 3 is a diagram that represents an example composite image frame 300 that may be generated using image frames acquired using the camera arrangement 200 of FIG. 2 in accordance with one or more embodiments. In some embodiments, a composite image frame 300 may be constructed from one or more image frames 302 acquired at or near the same time from different cameras 104. For example, in the illustrated embodiment, the composite image frame 300 may include a first portion A that is generated from a first image frame 302a acquired by the first camera 104a and depicting the first portion of the area 106 (e.g., area A), a second portion B that is generated from a second image frame 302b acquired by the second camera 104b and depicting the second portion of the area 106 (e.g., area B), a third portion C that is generated from a third image frame 302c acquired by the third camera 104c and depicting the third portion of the area 106 (e.g., area C), a fourth portion D that is generated from a fourth image frame 302d acquired by the fourth camera 104d and depicting the fourth portion of the area 106 (e.g., area D). Each of the first, second, third and fourth image frames 302a-302d may be acquired at or near the same time. For example, the image frames 302a-302d may be acquired at least within about the timespan associated with the frame frequency (e.g., about 0.0167 seconds for a frame rate of 60 Hz) of one another. Portions of the composite image frame 300 may include overlapping portions. For example, in the illustrated embodiment, the composite image frame 300 includes a first overlapping portion 304a that corresponds to portions of the first and second image frames 302a and 302b that depict the same portions of the field of view 202a (e.g., portion A-B), a second overlapping portion 304b that corresponds to portions of the second and third image frames 302b and 302c that depict the same portions of the field of view 202b (e.g., portion C-D), a third overlapping portion 304c that corresponds to portions of the third and fourth image frames 302c and 302d that depict the same portions of the field of view 202c (e.g., portion C-D), and a fourth overlapping portion 304d that corresponds to portions of the fourth and first image frames 302d and 302a that depict the same portions of the field of view 202d (e.g., portion D-A).

In some embodiments, the pixel values for pixel locations in a composite image frame 300 can be based on the value of corresponding pixel values of pixel locations in the image frames used to generate the composite image frame 300. For example, for each pixel location in the composite image frame 300, a pixel value may be assigned that is the maximum (or median or average) of the of the pixel values in the image frames 302 for that particular pixel location.

Accordingly, as described herein, the pixel values for the pixels located in the non-overlapping portions may be based on the corresponding pixel values in the single corresponding image frame 302. For example, the pixel locations in the non-overlapping portion of the composite image frame 300 corresponding to the first image frame 302a may be assigned a pixel value that is the same or similar to the pixel value of the corresponding pixel location in the first image frame 302a. Further, the pixel values for the pixel locations in the overlapping portions of the composite image frame 300 may be based on the corresponding pixel values of the pixel locations in the corresponding image frames 302. For example, each pixel location in the overlapping portion A-B of the composite image frame 300 may be assigned a pixel value that is the maximum (or median or average) value of the corresponding pixels in the image frames 302a and 302b that are used to generate that portion of the composite image frame 300.

Figure 4:
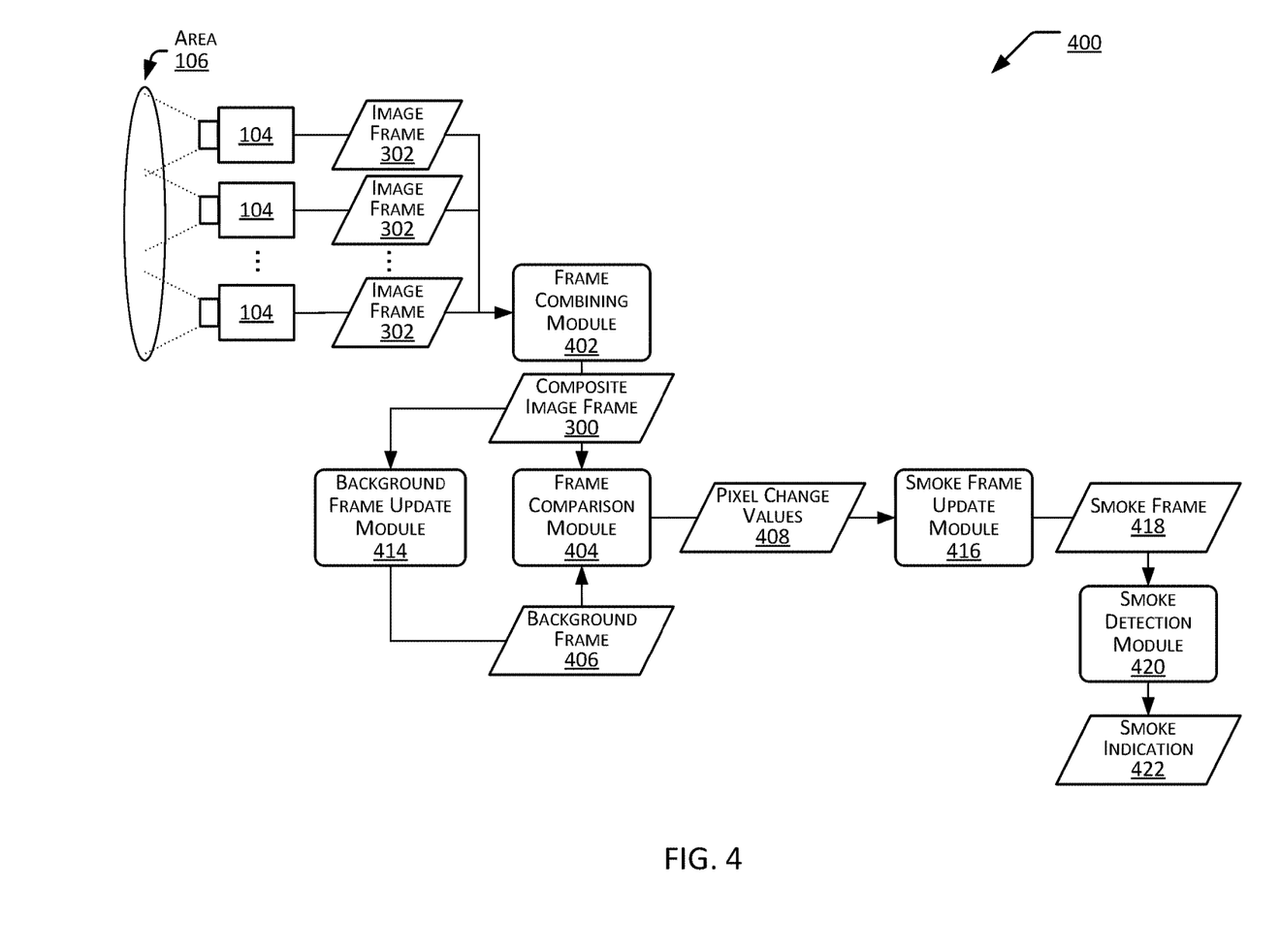
FIG. 4 is a flow diagram that illustrates a smoke (and/or fire) detection process in accordance with one or more embodiments.

FIG. 4 is a flow diagram that illustrates a smoke (and/or fire) detection process 400 in accordance with one or more embodiments. As described herein, in some embodiments, a smoke detection system 100 can include multiple cameras arranged to capture images of adjacent portions of an area. For example first and second video cameras 104 may be positioned adjacent one another with at least partially overlapping fields of view to capture images of an area 106. The first camera 104 may capture video images of right and center portions of the area 106 and, and the second video camera 104 may capture images of the same center portion of the area 106 along with a left portion of the area 106. Such an arrangement may provide full coverage of the area 106, including contiguous imaging that extends from the right portion of the area 106 to left portion of the area 106.

In some embodiments, image frames 302 captured by video cameras 104 are forwarded to a frame combining module 402. For example, the frame combining module 402 may receive, about every 0.0167 seconds, image frames 302 captured at or near the same time and provided by each of the video cameras 104 recording at 60 FPS. In some embodiments, the frame combining module 402 may combine the image frames 302 received from the different cameras 104 to generated a corresponding composite image frame 300. For example, in a first iteration of the process 400, the frame combining module 402 may combine a first image frame 302 (e.g., depicting a first area including the right and center portions of an area 106) captured at about 1:00:0000 pm by a first video camera 104 with a second image frame 302 (e.g., depicting a second area including the left and center portions of the area 106) captured at about 1:00:0000 pm by a second video camera 104 to generate a first composite image frame 300 that is a combination of the first and second image frames 302. Accordingly, the first composite image frame 300 may include, for example, a depiction of the right portion of the area 106 provided in the first image frame 302, a depiction of the left portion of the area 106 provided in the second image frame 302, and a depiction of the center portion of the area 106 that is generated using one or both of the depictions of the center portion of the area 106 provided in the first and second image frames 302. As further example, in a second iteration of the process 400, the frame combining module 402 may combine a third image frame 302 (e.g., depicting a first area including the right and center portions of an area 106) captured at about 1:00:0167 pm by the first video camera 104 with a fourth image frame 302 (e.g., depicting a second area including the left and center portions of the area 106) captured at about 1:00:0167 pm by the second video camera 104 to generate a second composite image frame 300 that is a combination of the third and fourth image frames 302. Such iterations may continue as images are continually acquired.

In some embodiments, a composite image frame 300 can be provided to a frame comparison module 404. For example, in a first iteration of the process 400, the first composite image frame 300 may be provided to the frame comparison module 404, in a second iteration of the process 400, the second composite image frame 300 may be provided to the frame comparison module 404, and so forth. In some embodiments, the frame comparison module 404 may subtract a composite image frame 300 for the area 106 from a background frame 406 of the area 106 to identify corresponding pixel change values 408. The pixel change values 408 may indicate, on a pixel-by-pixel basis, the difference between the pixel value of each pixel location in the composite image frame 300 and the pixel value of a corresponding pixel location in the background frame 106. For example, if a pixel location in a first location in the first composite image frame 300 (e.g., in the upper right-hand corner of the composite image frame 300) has a pixel value of 205 and a corresponding pixel location in the same location in the background frame 406 has a pixel value of 200, then the subtraction may determine a pixel change value of about 5 for that first pixel location. As a further example, if a pixel location in a second location in the composite image frame 300 (e.g., in the middle of the composite image frame 300) has a pixel value of 225 and a corresponding pixel location in the same location in the background frame 406 has a value of 210, then the subtraction may determine a pixel change value of about 15 for that second pixel location. A similar subtraction process can be conducted for some or all of the pixel locations in the first composite image 300 and the background frame 406 to generate a pixel change value for some or all of the respective pixel locations. As described herein, the pixel change values 408 may be used to generate a smoke frame 418 that is indicative of the presence of smoke in the field of view of the one or more cameras 104.

In some embodiments, a background frame update module 414 may generate an updated background frame 406 using a composite image frame 300. For example, an updated background frame 406 can be generated by a weighted combination of the composite image frame 300 (e.g., including the first and second pixel locations having values of 205 and 225, respectively) with a current version of the background frame 406 (e.g., including the first and second pixel locations having values of 200 and 210, respectively) to generate an updated background frame 406. In some embodiments, the current background frame 406 can be weighted more heavily than the composite image frame (e.g., 9999 to 1) such that the pixel values for pixel locations in the updated background frame 406 generally reflect the pixel values of corresponding pixel locations in the background frame 406, but can slowly shift over time if the pixel values in subsequent composite image frames 300 continue to differ from those in the background frame(s) 406. Continuing with the above example, if a 9999 to 1 weighting is employed, the pixel value for the first pixel location in the updated background frame 406 may be about 200.0005 (e.g., 200.0005=0.9999*200+0.0001*205) and the pixel value for the second pixel location in the updated background frame 406 may be about 210.0015 (e.g., 210.0015=0.9999*210+ 0.0001*225). Pixel values for each of the pixel locations in the updated background frame 406 can be determined in a similar manner.

In some embodiments, the frame comparison module 404 can use an updated background frame 406 as a basis for comparison of subsequently processed composite image frames 300. For example, if 100 composite image frames 300 were received previously, those 100 composite image frames 300 were used to generate a current background frame, and a $101^{st}$ composite image frame 300 is received, then the $101^{st}$ composite image frame 300 may be subtracted from the current background frame 406 (e.g., the background frame generated 406 using the 100 image frames) to identify differences in the $101^{st}$ composite image frame 300 relative to the current background frame 406 (e.g., to determine differences in pixel values for the pixel locations in the $101^{st}$ composite image frame 300 and the current background frame 406). Further, the composite image frame 300 (e.g., including the first and second pixel locations having values of 205 and 225, respectively) may be combined with a current version of the background frame 406 (e.g., including the first and second pixel locations having values of 200 and 210, respectively) to generate an updated background frame 406 (e.g., including the first and second pixel locations having pixel values of about 200.0005 and about 210.0015, respectively). If a next, $102^{nd}$ composite image frame 300 is received, then the $102^{nd}$ composite image frame 300 may be subtracted from the current background frame 406 (e.g., the background frame 406 generated using the $101^{st}$ composite image frame 300 and including the first and second pixel locations having pixel values of about 200.0005 and about 210.0015, respectively) to identify differences in the $102^{nd}$ composite image frame 300. Further, the $102^{nd}$ composite image frame 300 can be used to generate a next updated background frame 406 that can be used to assess the next composite image frame 300, and so forth.

In some embodiments, a smoke frame update module 416 can use the pixel change values 408 to generate (or update) a smoke frame 418. For example, the determined pixel change values 408 for the pixel locations can be assessed to identify one or more pixel locations associated with a pixel change value 408 that is equal to or greater than a pixel change threshold value (e.g., indicating that the pixel value for the pixel location of the composite image frame 300 is at least a threshold amount different than a pixel value for a corresponding pixel location in the background frame 406), and one or more pixels of the smoke frame 418 corresponding to the one or more pixels locations associated with a pixel change value 408 that is equal to or greater than a pixel change threshold value (e.g., 10) can be set to a predetermined value associated with smoke (e.g., a pixel value of 255). Continuing with the above example in which a pixel change value of 5 is associated with the first pixel location and a pixel change value of 15 is associated with the second pixel location, if a pixel change threshold value is set to 10, then a value for a first pixel location in the smoke frame 418 (e.g., a pixel location in the upper right-hand corner of the smoke frame 418) corresponding to the first pixel location in the composite image frame 300 (e.g., in the upper right-hand corner of the composite image frame 300) may be set to a value of 0 based on the associated pixel change value of 5 being less than the pixel change threshold value of 10. Further, a value for a second pixel location in the smoke frame 418 (e.g., a pixel in the middle of the smoke frame 418) corresponding to the second pixel location in the composite image frame 300 may be set to a value of 255 based on the associated pixel change value of 15 being greater than the pixel change threshold value of 10. Pixel values for some or all of the other pixel locations in the smoke frame 418 can be updated in a similar manner to generate a smoke frame 418 that includes pixel values of 255 for pixel locations associated with pixel change values that are equal to or greater than the pixel change threshold value and/or pixels values of 0 for pixel locations associated with pixel change values that are less than the pixel change threshold value.

In some embodiments, the ability to distinguish smoke or fire from noise and other artifacts may be enhanced by using the distance to various objects being imaged in the composite image, and when a distance changes between image frames, the pixel values associated with the imaged feature that is closer than known background features, such as walls, may be weighted more heavily as it is less likely such is noise or a random artifact. For example, a weighting factor may be applied to certain pixel values, for example, at the smoke frame module 416 (or possibly other modules descripted herein) to increase or decrease the impact of the associated pixel value. For instance, when those pixels are determined based on distances to be associated with known background features, such as a wall or desk, then the weighting factor may decrease the impact of those pixels on the disclosed processes, whereas pixel determined based on distances to be associated with a feature other than the expected background feature at the pixel location, then the weighting factor may increase the impact of those pixels on the disclosed processes. For example, in the overlapping regions of the composite image frame where two cameras are capturing image frames of the same area, the distances to the features in the composite image framed may be determined using parallax. If a feature in a composite image frame is determined to be closer than a known background feature, such as a wall or desk, then the pixel value assigned to the pixel location(s) associated with that feature may be weighted differently than other pixel locations associated with features that are determined to be known background features, as determined by distance. For example, the value assigned to pixels locations where the pixel change threshold value is satisfied and the distance to the feature captured at that location is less than that of the known background feature may be set to a value of 255, whereas the pixel value for other pixels locations where the pixel change threshold value is satisfied but the distance to the feature captured is the same or within an acceptable range of the known background feature may be set to a value of 200. As an alternative, a filter may be applied, such as by the frame comparison module 404 or the smoke frame module 416, to more accurately distinguish between background features, such as walls, and new features, such as smoke or fire, based on known distances to the background features. For example, such a filter may effectively reduce or eliminate the pixel change value associated with a pixel location when the feature captured at that pixel location is at the same distance, or within a predetermined range of, a known background feature of the area. By doing so the pixel change value of that pixel location is unlikely to satisfy the pixel change threshold value applied by the smoke frame update module 416, and may reduce erroneous detection of smoke or fire.

In some embodiments, a smoke detection module 420 can use a smoke frame 418 to determine whether smoke and/or fire is present. For example, the pixel values of the smoke frame 418 can be aggregated (e.g., added together) to generate a total (or sum) of the pixel values for the pixels of the smoke frame 418 (also referred to herein as a smoke value or "smoke frame value" for the smoke frame 418), and the smoke frame value can be compared to a smoke threshold value (e.g., 4,000,000). If the smoke frame value is equal to or greater than the smoke threshold value, then it may be determined that smoke (and/or fire) is present. If, however, the smoke frame value is less than the smoke threshold value, then it may be determined that smoke (and/or fire) is not present.

In some embodiments, the smoke detection module 420 can provide corresponding indication. In some embodiments, if it is determined that smoke (and/or fire) is present a corresponding smoke (and/or fire) indication 422 can be provided to a monitoring entity and/or a fire alarm can be triggered. For example, the smoke detection module 420 may output a smoke (and/or fire) alert 108. This can include, for example, providing a signal to a central smoke/fire monitoring system, alerting emergency response personnel (e.g., alerting a fire department), activating a fire suppression system, activating a smoke/fire alarm, and/or the like. In some embodiments, if it is determined that smoke (and/or fire) is not present a corresponding indication can be provided. For example, the smoke detection module 420 may output an "all-clear" signal to the central smoke/fire monitoring system, indicating that no smoke and/or fire has been detected.

Figure 5:
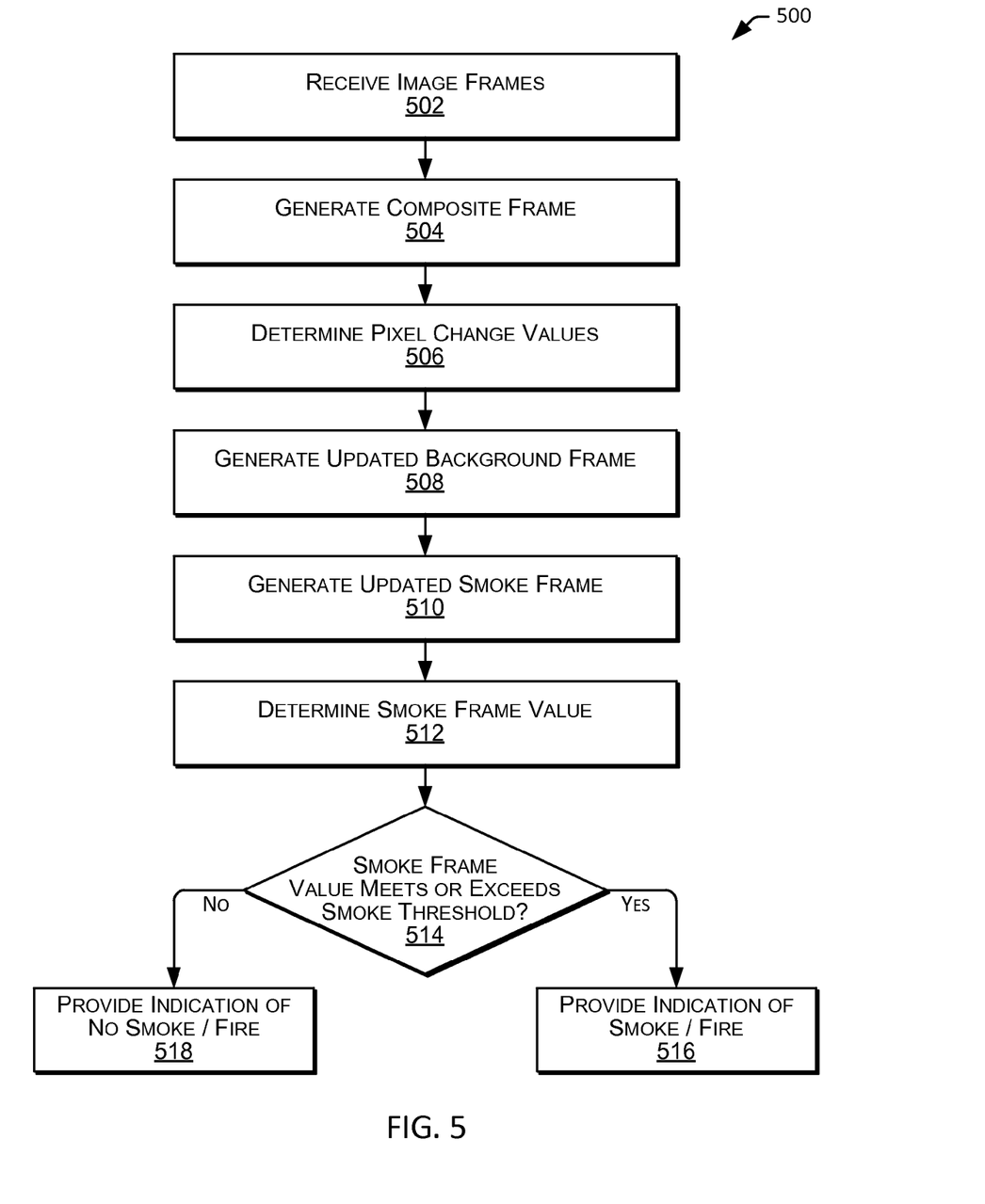
FIG. 5 is a flow diagram that illustrates an example method for smoke (and/or fire) detection in accordance with one or more embodiments.

FIG. 5 is a flow diagram that illustrates an example method 500 for smoke (and/or fire) detection in accordance with one or more embodiments. In some embodiments, some or all of the operations of the method 500 can be performed by the monitoring system 102. Method 500 can include receiving image frames (block 502). In some embodiments, receiving image frames can include the frame combining module 402 receiving image frames 302 received from one or more cameras 104 capturing images of an area 106. For example, the frame combining module 402 may receive, about every 0.0167 seconds, image frames 302 captured at or near the same time and provided by each of the video cameras 104 recording at 60 FPS.

Method 500 can include generating a composite image frame (block 504). In some embodiments, generating a composite image frame can include the frame combining module 402 combining the image frames 302 captured at or near the same time and received from the different cameras 104 to generate a corresponding composite image frame 300. For example, the frame combining module 402 may combine a first image frame 302 (e.g., depicting a first area including the right and center portions of an area 106) captured at about 1:00:0000 pm by a first video camera 104 with a second image frame 302 (e.g., depicting a second area including the left and center portions of the area 106) captured at about 1:00:0000 pm by a second video camera 104 to generate a first composite image frame 300 that is a combination of the first and second image frames 302.

Method 500 can include determining pixel change values (block 506). In some embodiments, determining pixel change values can include a frame comparison module 404 subtracting a composite image frame 300 for the area 106 from a background frame 406 of the area 106 to identify corresponding pixel change values 408. The pixel change values 408 may indicate, on a pixel-by-pixel basis, the difference between the pixel value of each pixel location in the composite image frame 300 and the pixel value of a corresponding pixel location in the background frame 106. For example, if a pixel location in a first location in the first composite image frame 300 (e.g., in the upper right-hand corner of the composite image frame 300) has a pixel value of 205 and a corresponding pixel location in the same location in the background frame 406 has a pixel value of 200, then the subtraction may determine a pixel change value of about 5 for that first pixel location. As a further example, if a pixel location in a second location in the composite image frame 300 (e.g., in the middle of the composite image frame 300) has a pixel value of 225 and a corresponding pixel location in the same location in the background frame 406 has a value of 210, then the subtraction may determine a pixel change value of about 15 for that second pixel location. A similar subtraction process can be conducted for some or all of the pixel locations in the first composite image 300 and the background frame 406 to generate a pixel change value for some or all of the respective pixel locations. As described herein, the pixel changes values 408 may be used to generate a smoke frame 418 that is indicative of the presence of smoke in the field of view of the one or more cameras 104.

Method 500 can include generating an updated background frame (block 508), which may occur any time before a subsequent composite image is compared to a background frame to determine pixel change values, and not necessary prior to any of the following steps (e.g., block 510-518) associated with the processing of the current composite image. In some embodiments, determining pixel change values can include a background frame update module 414 generating an updated background frame 406 using a composite image frame 300. For example, an updated background frame 406 can be generated by a weighted combination of the composite image frame 300 (e.g., including the first and second pixel locations having values of 205 and 225, respectively) with a current version of the background frame 406 (e.g., including the first and second pixel locations having values of 200 and 210, respectively) to generate an updated background frame 406. In some embodiments, the current background frame 406 can be weighted more heavily than the composite image frame (e.g., 9999 to 1) such that the pixel values for pixel locations in the updated background frame 406 generally reflect the pixel values of corresponding pixel locations in the background frame 406, but can slowly shift over time if the pixel values in subsequent composite image frames 300 continue to differ from those in the background frame(s) 406. Continuing with the above example, if a 9999 to 1 weighting is employed, the pixel value for the first pixel location in the updated background frame 406 may be about 200.0005 (e.g., 200.0005=0.9999*200+0.0001*205) and the pixel value for the second pixel location in the updated background frame 406 may be about 210.0015 (e.g., 210.0015=0.9999*210+0.0001*225). Pixel values for each of the pixel locations in the updated background frame 406 can be determined in a similar manner.

Method 500 can include generating an updated smoke frame (block 510). In some embodiments, generating an updated smoke frame can include a smoke frame update module 416 using the pixel change values 408 to generate (or update) a smoke frame 418. For example, the determined pixel change values 408 for the pixel locations can be assessed to identify one or more pixel locations associated with a pixel change value 408 that is equal to or greater than a pixel change threshold value (e.g., indicating that the pixel value for the pixel location of the composite image frame 300 is at least a threshold amount different than a pixel value for a corresponding pixel location in the background frame 406), and one or more pixels of the smoke frame 418 corresponding to the one or more pixels locations associated with a pixel change value 408 that is equal to or greater than a pixel change threshold value (e.g., 10) can be set to a predetermined value associated with smoke (e.g., a pixel value of 255). Continuing with the above example in which a pixel change value of 5 is associated with the first pixel location and a pixel change value of 15 is associated with the second pixel location, if a pixel change threshold value is set to 10, then a value for a first pixel location in the smoke frame 418 (e.g., a pixel location in the upper right-hand corner of the smoke frame 418) corresponding to the first pixel location in the composite image frame 300 (e.g., in the upper right-hand corner of the composite image frame 300) may be set to a value of 0 based on the associated pixel change value of 5 being less than the pixel change threshold value of 10. Further, a value for a second pixel location in the smoke frame 418 (e.g., a pixel in the middle of the smoke frame 418) corresponding to the second pixel location in the composite image frame 300 may be set to a value of 255 based on the associated pixel change value of 15 being greater than the pixel change threshold value of 10. Pixel values for some or all of the other pixel locations in the smoke frame 418 can be updated in a similar manner to generate a smoke frame 418 that includes pixel values of 255 for pixel locations associated with pixel change values that are equal to or greater than the pixel change threshold value and/or pixels values of 0 for pixel locations associated with pixel change values that are less than the pixel change threshold value.

Method 500 can include determining a smoke frame value (block 512). In some embodiments, determining a smoke frame value can include a smoke detection module 420 aggregating (e.g., adding) the pixel values of the smoke frame 418 to generate a sum (or total) of the pixel values for the pixels of the smoke frame (also referred to herein as a "smoke frame value" for the smoke frame 418).

Method 500 can include determining whether a smoke frame value meets or exceeds a smoke threshold value (block 514). In some embodiments, determining whether a smoke frame value exceeds a smoke threshold value can include the smoke detection module 420 comparing the smoke frame value to a smoke threshold value (e.g., 4,000,000). If the smoke frame value is equal to or greater than the smoke threshold value, then it may be determined that smoke (and/or fire) is present, and an indication of smoke and/or fire can be provided (block 516). For example, the smoke detection module 420 may output a smoke (and/or fire) alert 108. This can include, for example, providing a signal to a central smoke/fire monitoring system, alerting emergency response personnel (e.g., alerting a fire department), activating a fire suppression system, activating a smoke/fire alarm, and/or the like. If, however, the smoke frame value is less than the smoke threshold value, then it may be determined that smoke (and/or fire) is not present, and an indication of no smoke and/or no fire can be provided (block 518). For example, the smoke detection module 420 may output an "all-clear" signal to the central smoke/fire monitoring system, indicating that no smoke and/or fire has been detected.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

Figure 6:
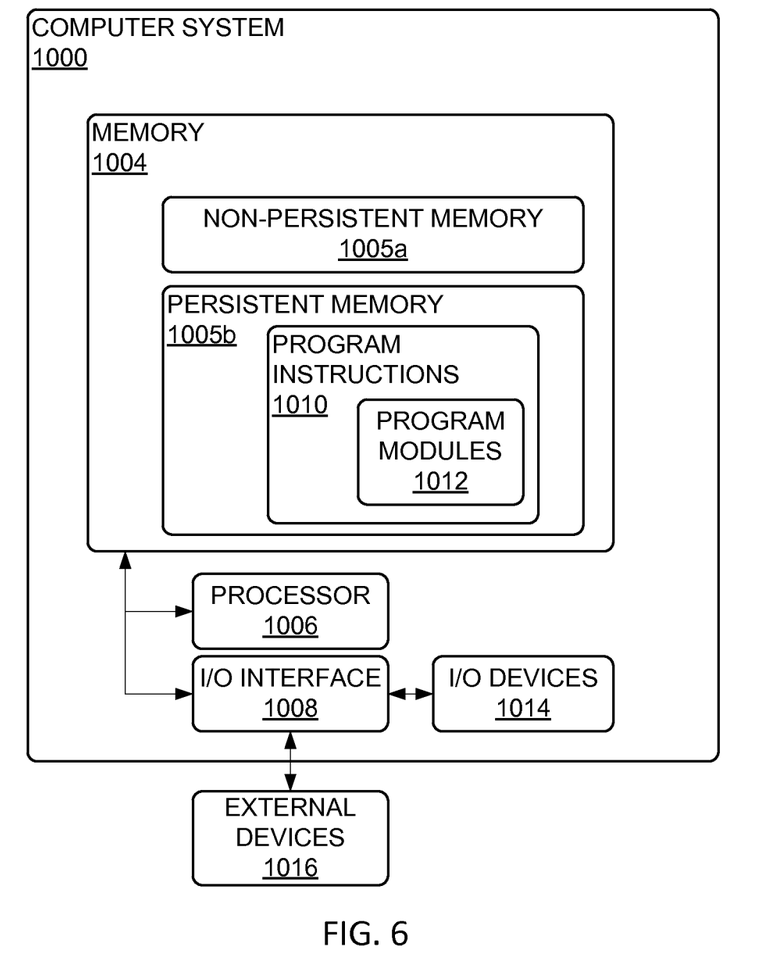
FIG. 6 is a diagram that illustrates an example computer system in accordance with one or more embodiments.

FIG. 6 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The memory may include non-persistent memory 1005a (e.g., DRAM and/or the like) and/or persistent memory 1005b (e.g., a hard drive and/or the like). The program instructions 1010 may include program modules 1012 that are executable by a computer processor (e.g., the processor 1006) to cause the functional operations described herein, including those described with regard to the process 400 and the method 500. In the context of a computer system of monitoring system 102, the program modules 1012 may include one or more of a frame combining module 402, a frame comparison module 404, a background frame update module 414, a smoke frame update module 416, a smoke detection module 420, and/or the like for performing some or all of the operations described herein.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, a transceiver, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for fire detection, the method comprising:
receiving, from a first camera, a first image frame that depicts a first area;
receiving, from a second camera, a second image frame that depicts a second area;
combining, by one or more processors, the first image frame and the second image frame to generate a composite image frame that depicts a third area comprising the first area and the second area;
identify a background frame representing the third area, the background frame generated using past composite image frames of the third area;
determining, by the one or more processors, for each pixel of the composite image frame, a difference between a value of a pixel of the composite image frame and a value of a corresponding pixel of the background frame;
determining, by the one or more processors, a first set of pixels of the composite image frame, where for each pixel of the first set of pixels the difference between the value of the pixel of the composite image frame and a value of the corresponding pixel of the background frame exceeds a threshold value;
determining, by the one or more processors, a smoke frame that corresponds to the composite image frame, wherein a second set of pixels of the smoke frame that correspond to the first set of pixels of the composite image frame are assigned a first pixel value;
determining, by the one or more processors, a sum of the first pixel value for the second set of pixels of the smoke frame;
determining, by the one or more processors, that the sum exceeds a smoke threshold value;
providing, by the one or more processors, an indication that smoke is present in the third area.

2. The method of claim 1, further comprising:
generating an updated background frame using pixel values of the composite image frame and pixel values of the background frame;
receiving, from the first camera, a third image frame that depicts the first area;
receiving, from the second camera, a fourth image frame that depicts the second area;
combining the third image frame and the fourth image frame to generate a second composite image frame that depicts a third area; and
determining, by the one or more processors, for each pixel of the second composite image frame, a second difference between a value of a pixel of the second composite image frame and a value of a corresponding pixel of a second background frame.

3. The method of claim 1, wherein combining the first and the second image frames further comprising:
determining an overlapping region of the first and second image frames, the overlapping region including a first portion of the first image frame and a second portion of the second image frame;
determining a first saturation value for the first portion of the first image frame, wherein the first saturation value is an average of pixel values of the first portion of the first image frame;
determining a second saturation value for the second portion of the second image frame, wherein the second saturation value is an average of pixel values of the second portion of the second image frame; and
determining that the first saturation value and the second saturation value are above a saturation threshold value, wherein values below the saturation threshold value represent oversaturation.

4. A method, comprising:
receiving a first image frame that represents an image of a first area and a second image frame that represent images of a second area;
combining, by one or more processors, the first and second image frames to generate a composite image frame that represents an image of a third area comprising the first area and the second area;
comparing, by the one or more processors, the composite image frame to a background frame of the third area to determine a first set of pixels of the composite frame having a pixel value that is different from corresponding pixels of the background frame;
determining, by the one or more processors, a smoke frame, wherein a second set of pixels of the smoke frame correspond to the first set of pixels of the composite frame;
determining, by the one or more processors, a smoke value using values of the second set of pixels of the smoke frame; and
determining, by the one or more processors, a detection of smoke or fire in the third area using the smoke value; and
providing an indication of the detection.

5. The method of claim 4, further comprising:
generating an updated background frame comprising a combination of the composite image frame and the background frame;

receiving a third image frame and a fourth image frame that represent images of the first and second areas;

combining the third image frame and the fourth image frame to generate a second composite image frame that represents a second image of the third area; and comparing the second composite image frame to the updated background frame to determine one or more second pixels of the second composite frame having a pixel value that is different from corresponding pixels of the updated background frame.

6. The method of claim 4, further comprising generating an updated background frame comprising a combination of pixel values of pixels of the composite image frame and pixel values of pixels of the background image frame.

7. The method of claim 4, wherein receiving a first image frame and a second image frame comprises:
receiving the first image frame from a first camera having a first field of view; and
receiving the second image frame from a second camera having a second field of view;
wherein the second field of view at least partially overlaps the first field of view.

8. The method of claim 4, wherein combining the first and second image frames to generate the composite image frame comprises g selecting for a pixel in the composite image frame a pixel value that is the pixel value of a corresponding pixel in the first image frame or a pixel value of a corresponding pixel in the second image frame.

9. The method of claim 4, wherein combining the first and second image frames to generate the composite image frame comprises, determining for a pixel location in the composite image frame, an average of a pixel value of a corresponding pixel in the first image frame and a pixel value of a corresponding pixel in the second image frame.

10. The method of claim 4, wherein determining the smoke frame comprises assigning the pixel values of the first pixels of the smoke frame a first value.

11. The method of claim 4, wherein comparing the composite image frame to the background frame further comprises determining the first set of pixels of the composite frame, wherein each pixel of the first set of pixels having a pixel value that is different from a pixel value of a corresponding pixel of the background frame by at least a threshold amount.

12. The method of claim 4, further comprising:
determining an overlapping region of the first image frame and the second image frame,
the overlapping region including a first portion of the first image frame and a second portion of the second image frame;
determining a first saturation value for the first portion of the first image;
determining a second saturation value for the second portion of the second image; and
determining that the first saturation value and the second saturation value satisfy a saturation threshold value.

13. A system comprising:
a processor; and
a memory comprising program instructions stored thereon that are executable by the processor to cause:
receiving a first image frame that represents an image of a first area and a second image frame that represent an image of a second area;
combining the first and second image frames to generate a composite image frame that represents an image of a third area comprising the first area and the second area;

comparing the composite image frame to a background frame associated with the first area to determine a first set of pixels of the composite frame, each pixel of the first set of pixels of the composite frame having a pixel value that is different from a pixel value of a corresponding pixel of the background frame;
determining a smoke frame, wherein a second set of pixels of the smoke frame correspond to the first set of pixels of the composite frame;
determining a detection of smoke or fire in the third area using a smoke value;
and providing an indication of the detection of smoke or fire.

14. The system of claim 13, the program instructions further executable by the processor to cause:
generating an updated background frame comprising a combination of the composite image frame and the background frame;
receiving a third image frame and a fourth image frame that that represent images of the first are and the second area;
combining the third and fourth image frames to generate a second composite image frame that represents a second image of the first area; and
comparing the second composite image frame to the updated background frame to determine second pixels of the second composite frame, the second pixels each having a pixel value that is different from a pixel value of a corresponding pixel of the updated background frame.

15. The system of claim 14, the program instructions further executable by the processor to cause generating an updated background frame that comprises a combination of the pixel values of pixels of the composite image frame and the pixel values of the pixels of the background image frame.

16. The system of claim 13, wherein receiving the first and second image frames comprises:
receiving the first image frame from a first camera having a first field of view; and
receiving the second image frame from a second camera having a second field of view,
wherein the second field of view at least partially overlaps the first field of view.

17. The system of claim 13, wherein combining the first and second image frames to generate a composite image frame comprises generating a composite image frame that comprises selecting for a pixel location in the composite image frame, a pixel value from the pixel value of a corresponding pixel in the first image and a pixel value of a corresponding pixel in the second image frame.

18. The system of claim 13, wherein combining the first and second image frames to generate a composite image frame comprises generating a composite image frame that comprises determining, for a pixel location in the composite image frame, a pixel value that is an average of a pixel value associated with a corresponding pixel locations of the first image and a pixel value associated with a corresponding pixel location of the second image.

19. The system of claim 13, wherein determining the smoke value comprises assigning the values of the second set of pixels of the smoke frame to a first value.

20. The system of claim 13, wherein comparing the composite image frame to the background frame associated with the area to determine one or more pixels of the composite frame further comprises determining the first set of pixels of the composite frame, wherein each pixel of the first set of pixels having a pixel value that is different from a pixel value of a corresponding pixel of the background frame by at least a threshold amount.

\* \* \* \* \*